March 22, 1966 R. N. BROWN 3,241,415
CUTTING MACHINE WITH MEANS TO ALIGN CUTTERS
WITH VISUAL GUIDE MEANS FOR WEB
Filed Nov. 6, 1963
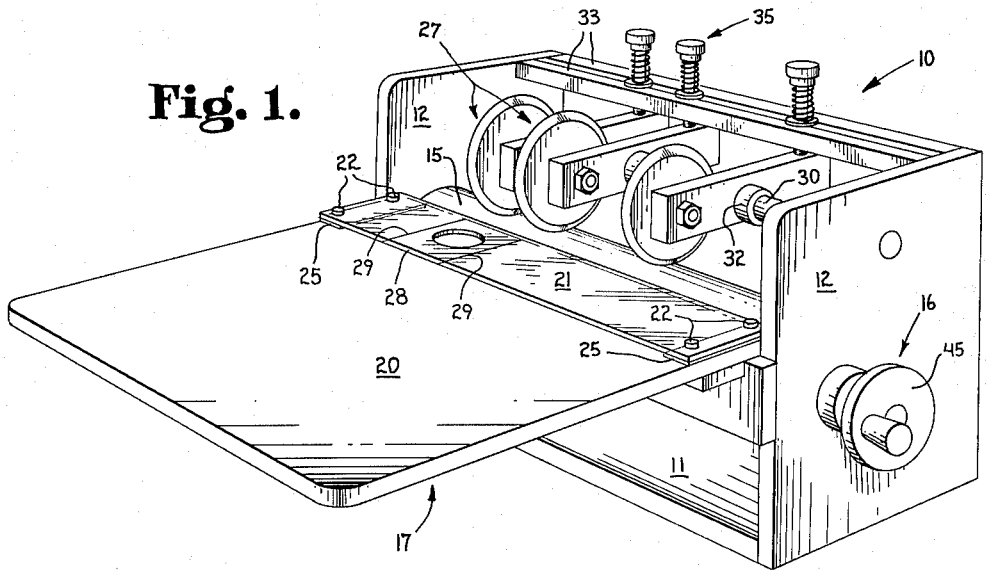
Fig. 1.
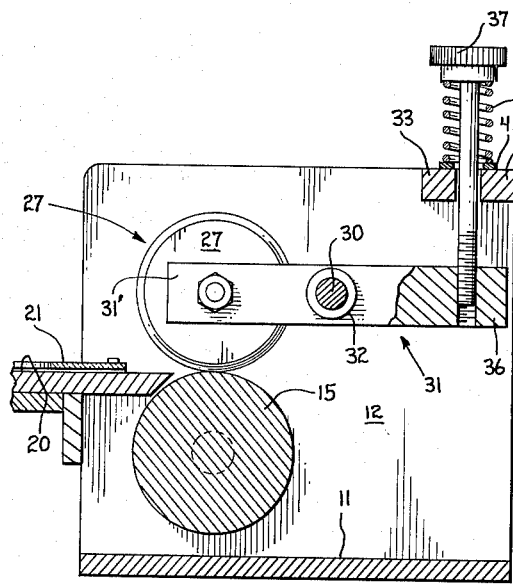
Fig. 2.
Fig. 3.
INVENTOR.
Robert N. Brown
BY
Lockwood, Woodard, Smith & Weikart
Attorneys

United States Patent Office 3,241,415
Patented Mar. 22, 1966

3,241,415
CUTTING MACHINE WITH MEANS TO ALIGN
CUTTERS WITH VISUAL GUIDE MEANS
FOR WEB
Robert N. Brown, Columbus, Ind., assignor to Home
News Enterprises, a partnership, Columbus, Ind.
Filed Nov. 6, 1963, Ser. No. 321,815
1 Claim. (Cl. 83—433)

The present invention relates to a scoring or cutting device particularly adapted for trimming columns for newspapers.

In the preparation of newspapers, it is the practice to first prepare the articles in the form of columns exactly as they will appear in the final newspaper. In performing this task, the columns are first typed and then trimmed exactly at the edge of the typewritten portion. Of course, none of the typewritten portion should be cut off and no untyped paper should be left on the column. In many establishments, this trimming operation is performed with a pair of scissors. This operation is time consuming and not always as accurate as might be desired. Consequently, an important object of the present invention is to provide a cutting device particularly adapted for trimming newspaper columns.

A further object of the invention is to provide an improved trimming device.

Related objects and advantages will become apparent as the description proceeds.

One embodiment of the present invention might include a cutting device comprising a frame including two sidewalls fixed in parallel spaced relation, a steel cylindrical roller mounted on said frame for rotation between said walls, said roller being retained against axial movement by said sidewalls, a crank positioned outboard of one wall and operatively connected to said roller for rotation thereof, a flat work support fixed to said frame between said sidewalls and tangentially aligned with the periphery of said roller, a cylindrical rod fixed to said frame between said sidewalls and extending in parallel relation to said roller, a plurality of levers pivotally received adjacent their centers on said rod, collars fixed to said rod on opposite sides of each of said levers and preventing movement of each lever axially of the rod, said collars being adjustable longitudinally of said rod to adjust the position of said levers, a plurality of circular disc cutter blades each having a cutting edge around its periphery, each of said cutter blades being rotatably mounted on a respective lever at one end thereof for rotation about an axis parallel to the axis of said roller, each of said levers being swingable to move its respective cutter blade into engagement with said roller at the line of tangential alignment with said work support, a pair of bars fixed to said frame and extending between said sidewalls in parallel spaced relation, a plurality of screws each threaded into a respective one of said levers at the other end thereof, each of said screws extending between said bars and having an enlarged knurled head on the end of the screw away from said lever, a plurality of coiled compression springs each received on a respective screw and acting between the head of the screw and the pair of bars to yieldably pivot the respective lever of the screw to yieldably move its respective cutter blade into engagement with said roller, and a transparent plastic guide element fixed to said flat work support and tangentially aligned with the periphery of said roller for guiding sheets of material from between said guide element and support tangentially of said roller and between said roller and cutter blades.

The full nature of the invention will be understood from the accompanying drawings and the following description and claim.

FIG. 1 is a perspective view of the cutting device of the present invention.

FIG. 2 is an enlarged fragmentary vertical transverse section of the structure illustrated in FIG. 1.

FIG. 3 is an enlarged fragmentary top plan of the structure illustrated in FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a cutting device 10 which includes a frame 11 comprising two sidewalls 12 fixed in spaced parallel relation. A steel cylindrical roller 15 is rotatably mounted on the frame between the sidewalls 12 and is limited against axial movement by the sidewalls. A crank 16 is fixed to the roller and may be used for rotation of the roller.

A flat work support 17 is fixed to the frame between the sidewalls 12 and provides a horizontal surface 20 across which the newspaper columns are moved into the device for trimming of the columns. The flat surface 20 is tangentially aligned with the periphery of the roller 15. Fixed to the work support 17 is a transparent plastic guide element 21 which functions to insure that the columns are flat against the surface 20 as they move into the device for cutting. The guide element 21 is fixed to the support 17 by screws 22 and is spaced from the surface 20 by spacer elements 25 which provide only a sufficient distance between the members 17 and 21 to permit a column to be moved therebetween. The element 21 is formed with a circular opening 26 which facilitates feeding of the column and permits the retaining of control on the column after the trailing end thereof has cleared the edge 28 of the element 21. The element 21 also has parallel lines 29 inscribed on the underneath side thereof. The lines 29 can be used as a guide when moving the column into the device for trimming.

A cylindrical rod 30 is fixed to the frame between the sidewalls 12 and extends in parallel relation to the roller 15. Each of the cutter blades 27 is rotatably mounted upon the end 31' of a respective lever 31, each of which are, in turn, pivotally received adjacent their centers on the cylindrical rod 30. A pair of collars 32 are fixed to the rod 30 on opposite sides of each of the levers 31 and function to prevent movement of the respective lever axially of the rod. Each of the collars 32 is provided with a setscrew making it adjustable longitudinally of the rod for adjusting the position of the levers.

A pair of bars 33 are fixed to the frame and extend between the sidewalls 12 in parallel relation to one another. Each of the levers 31 has a screw 35 threaded into the lever at its end 36. Each of the screws 35 extends between the bars 33 and has an enlarged knurled head 37 which is larger than the spacing between the bars 33. Each of the screws 35 has received thereon a coiled compression spring 40 which acts between the enlarged head 37 of the screw 35 and the bars 33. A washer 41 is provided between the spring 40 and the bars 33 to insure accurate seating of the spring against the bars.

As mentioned, the roller 15 is tangentially aligned with the surface 20 of the work support 17. The cutter blades 27 are swingable into engagement with the roller 15 at the line of tangential alignment with the work support 20. The spring 40 of each cutter blade 27 yieldably holds the respective screw 35 upwardly thus yieldably pivoting the lever 31 and cutter blade into engagement with the roller 15.

The device is operated by feeding the untrimmed column across the work support 17 and beneath the guide 21. The operator can use the lines 29 to align the column between the blades 27. The operator rotates the crank 16 causing the roller 15 to pull the column between the blades and roller 15 so that the biased cutter blades 27 trim off the sides of the column. The amount of force with which each cutter blade presses against the roller 15 can be adjusted by screwing or unscrewing the associated screw 35 into or out of the respective lever 31. If relatively slow careful feeding of the column is desired, the knob portion 45 of the crank 16 can be used to feed the column. Knob 45 has the advantage of giving more precise control when starting the feed and the crank gives higher speed rotation after proper alignment has been achieved. It can be appreciated from the above description that the present invention provides an improved cutting device which is particularly adapted for trimming of paper items such as newspaper columns.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A cutting device comprising a frame including two sidewalls fixed in parallel spaced relation, a steel cylindrical roller mounted on said frame for rotation between said walls, said roller being retained against axial movement by said sidewalls, a crank positioned outboard of one wall and operatively connected to said roller for rotation thereof, a flat work support fixed to said frame between said sidewalls and tangentially aligned with the periphery of said roller, a cylindrical rod fixed to said frame between said sidewalls and extending in parallel relation to said roller, a plurality of levers pivotally received centrally thereof on said rod, collars fixed to said rod on opposite sides of each of said levers and preventing movement of each lever axially of the rod, said collars being adjustable longitudinally of said rod to adjust the position of said levers, a plurality of circular disc cutter blades each having a cutting edge around its periphery, each of said cutter blades being rotatably mounted on a respective lever at one end thereof for rotation about an axis parallel to the axis of said roller, each of said levers being swingable to move its respective cutter blade into engagement with said roller at the line of tangential alignment with said work support, a pair of bars fixed to said frame and extending between said sidewalls in parallel spaced relation, a plurality of screws each threaded into a respective one of said levers at the other end thereof, each of said screws extending between said bars and having an enlarged knurled head on the end of the screw away from said lever, a plurality of coiled compression springs each received on a respective screw and acting between the head of the screw and the pair of bars to yieldably pivot the respective lever of the screw to yieldably move its respective cutter blade into engagement with said roller, and a transparent plastic guide element fixed to said flat work support and tangentially aligned with the periphery of said roller, said plastic guide element having lines inscribed thereon alignable with said cutter blades by movement of said collars on said rod for guiding sheets of material from between said guide element and support tangentially of said roller and between said roller and cutter blades.

References Cited by the Examiner
UNITED STATES PATENTS

| | | | |
|---|---|---|---|
| 246,923 | 9/1881 | Turner | 83—522 X |
| 927,400 | 7/1909 | Ball | 83—346 |
| 1,130,909 | 3/1915 | Kremer | 83—506 |
| 1,167,435 | 1/1916 | Robertson et al. | 83—522 X |
| 1,351,751 | 9/1920 | Hoff | 83—505 |
| 1,511,054 | 10/1924 | Duncan | 83—450 |
| 1,695,715 | 12/1928 | Merrick | 83—506 |
| 1,730,196 | 10/1929 | De Pamphilis | 83—506 |
| 2,000,175 | 5/1935 | Johnstone et al. | 83—505 |
| 2,360,653 | 10/1944 | Davidson | 83—506 |
| 2,684,117 | 7/1954 | Wood | 83—506 |
| 2,783,842 | 3/1957 | Mainardi et al. | 83—917 |
| 3,152,501 | 10/1964 | Nassar | 83—676 |

FOREIGN PATENTS

| | | |
|---|---|---|
| 23,952 | 10/1911 | Great Britain. |

ANDREW R. JUHASZ, *Primary Examiner.*

WILLIAM W. DYER, Jr., *Examiner.*